(12) United States Patent
Craig et al.

(10) Patent No.: US 6,408,831 B1
(45) Date of Patent: Jun. 25, 2002

(54) SYSTEM FOR CONTROLLING THE TEMPERATURE OF AN INTAKE AIR

(75) Inventors: Mark W. Craig, Mossville, IL (US);
Eric D. Hardin, Bellevue, WA (US);
Tony G. Kertz, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/742,701

(22) Filed: Dec. 20, 2000

(51) Int. Cl.⁷ ............................................. F02M 21/04
(52) U.S. Cl. ...................................... 123/542; 123/556
(58) Field of Search ................ 123/542, 556, 123/552

(56) References Cited

U.S. PATENT DOCUMENTS

| | | | |
|---|---|---|---|
| 5,172,753 A | * 12/1992 | Kadle et al. | 123/542 |
| 5,375,580 A | * 12/1994 | Stolz et al. | 123/542 |
| 5,740,786 A | * 4/1998 | Gartner | 123/556 |
| 6,293,262 B1 | * 9/2001 | Craig et al. | 123/542 |

* cited by examiner

Primary Examiner—Marguerite McMahon
(74) Attorney, Agent, or Firm—Larry G. Cain

(57) ABSTRACT

A vehicle operates under various ambient conditions and various operating parameters. To compensate for the ambient condition and the operating parameters an engine, an intake air temperature is controlled. One of an ambient air flow restriction system or an intake air flow restriction system is used to vary the flow of a recipient ambient air flow through an air to air or the flow of a donor intake air flow through the aftercooler respectively. A plurality of louvers are operatively moved between a closed position and an open position with the ambient air flow restriction system. And, a flapper valve is operatively moved between a closed position and an open position with the intake air flow restriction system. A controller interprets a respective signal from a plurality of sensors to define the position of the plurality of louvers or to define the position of the flapper valve.

20 Claims, 5 Drawing Sheets

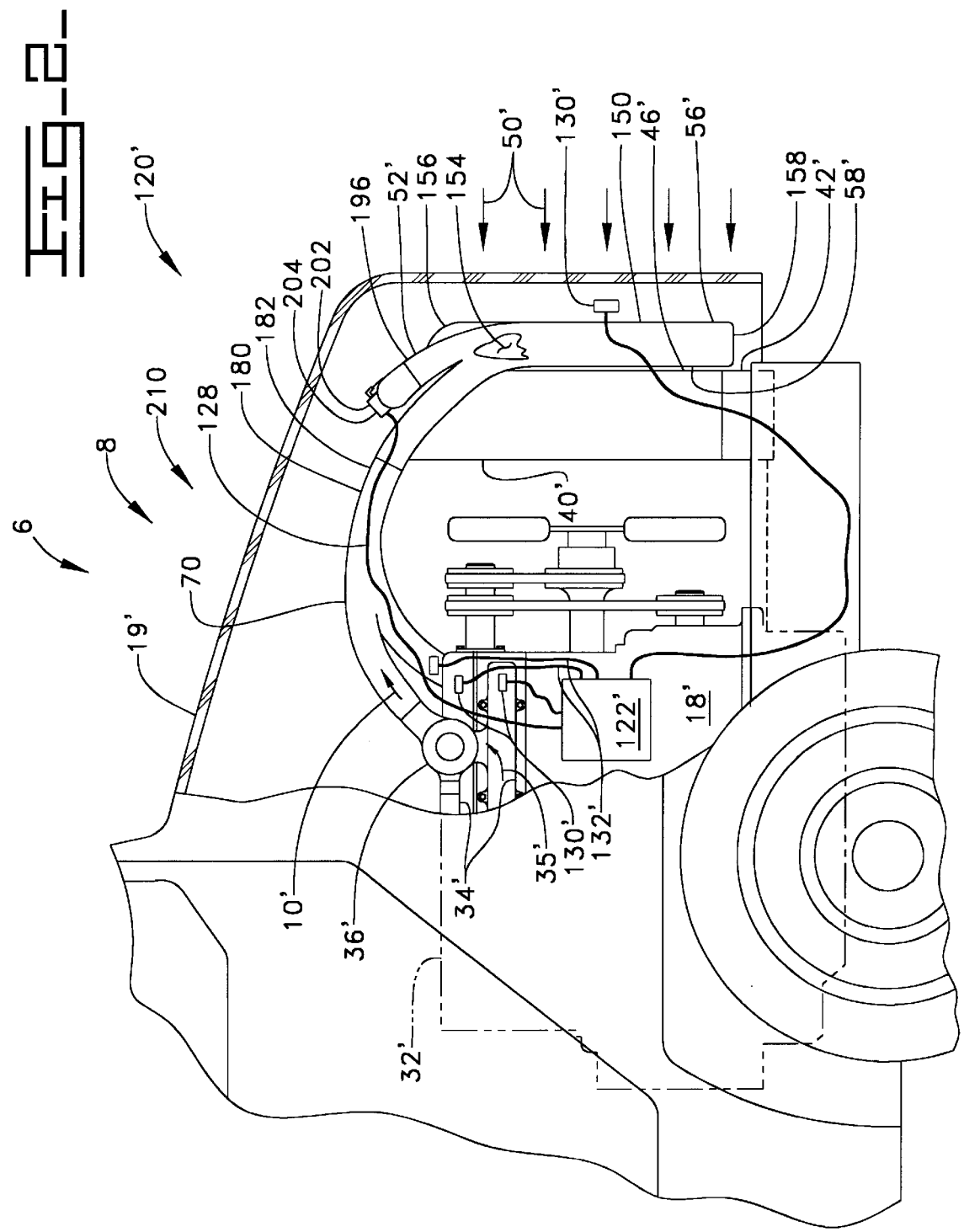

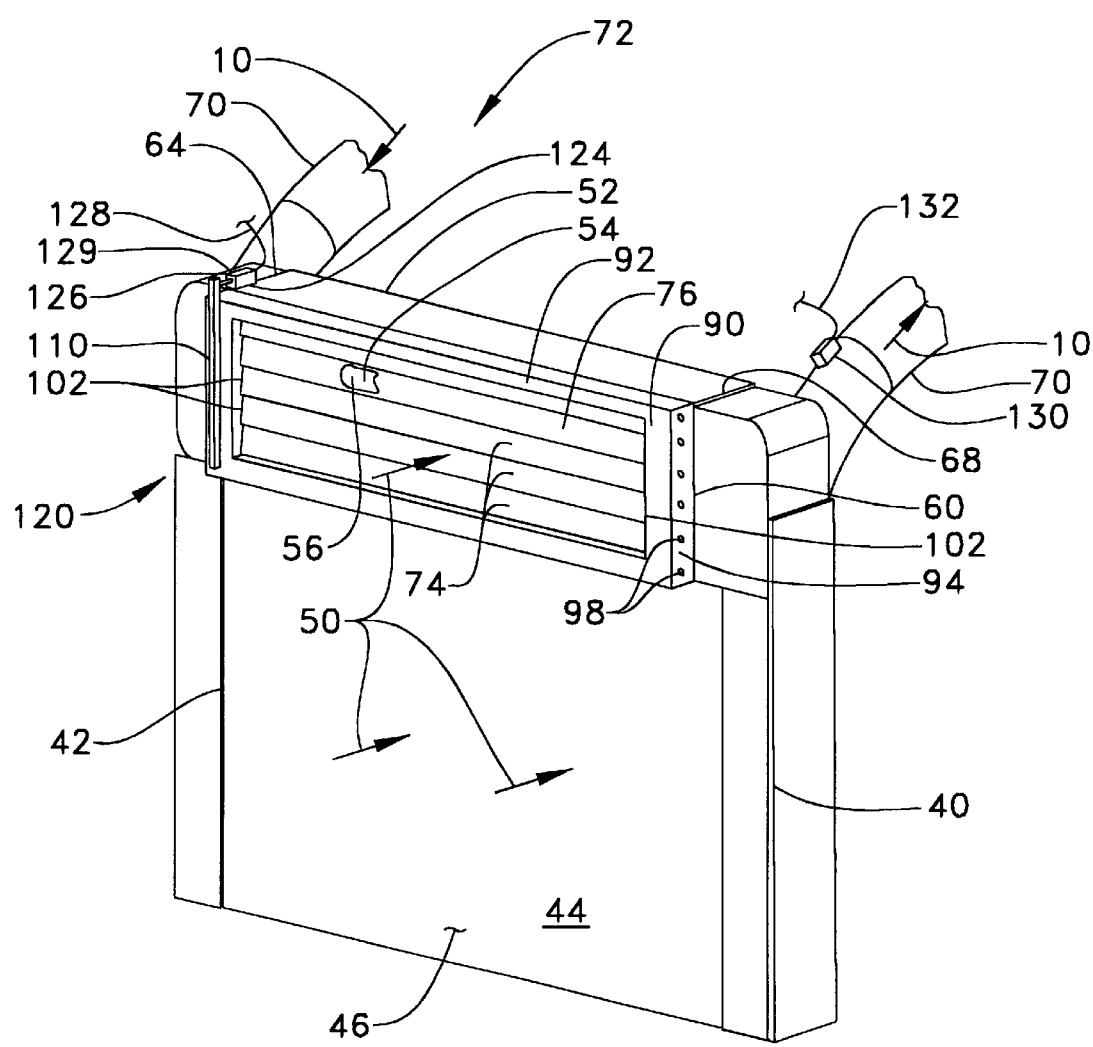

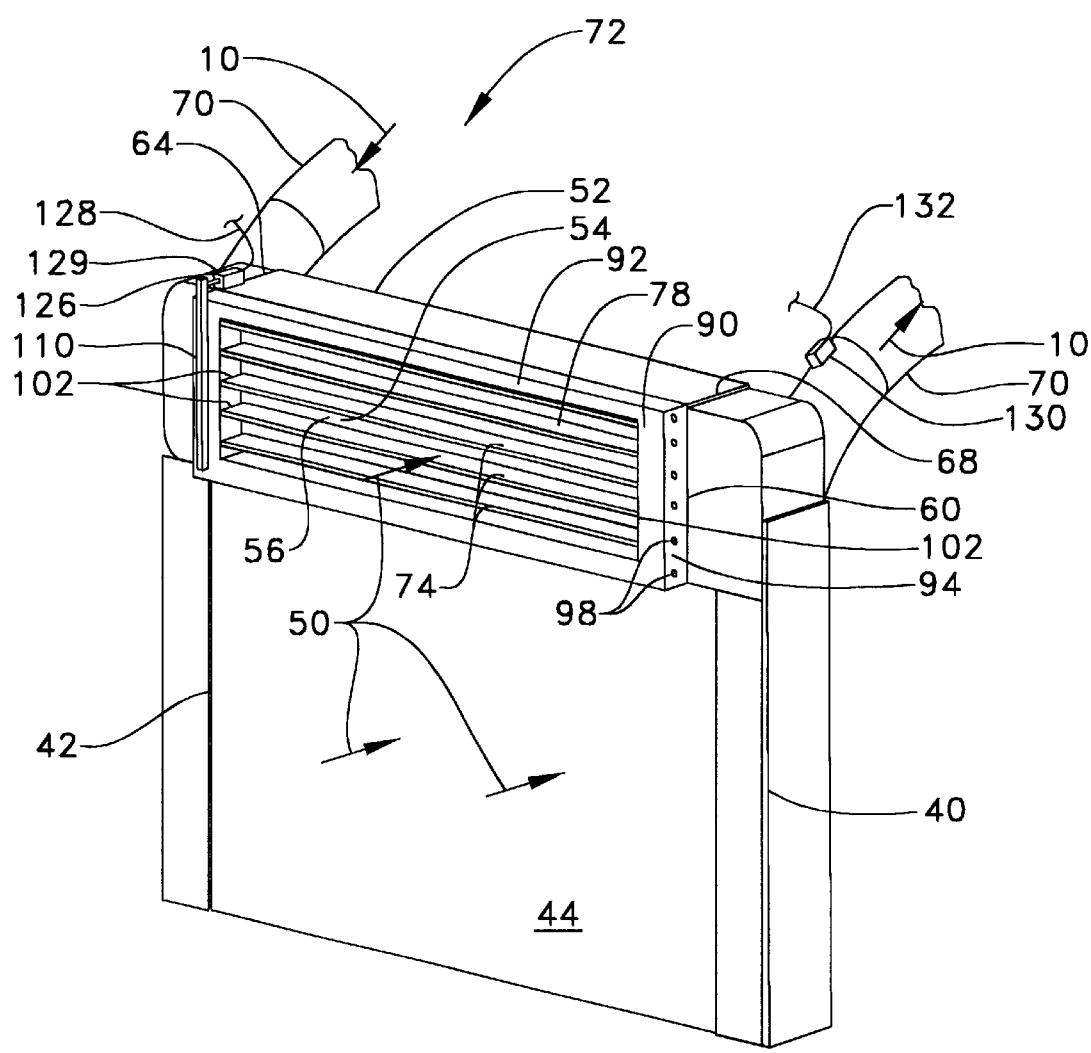

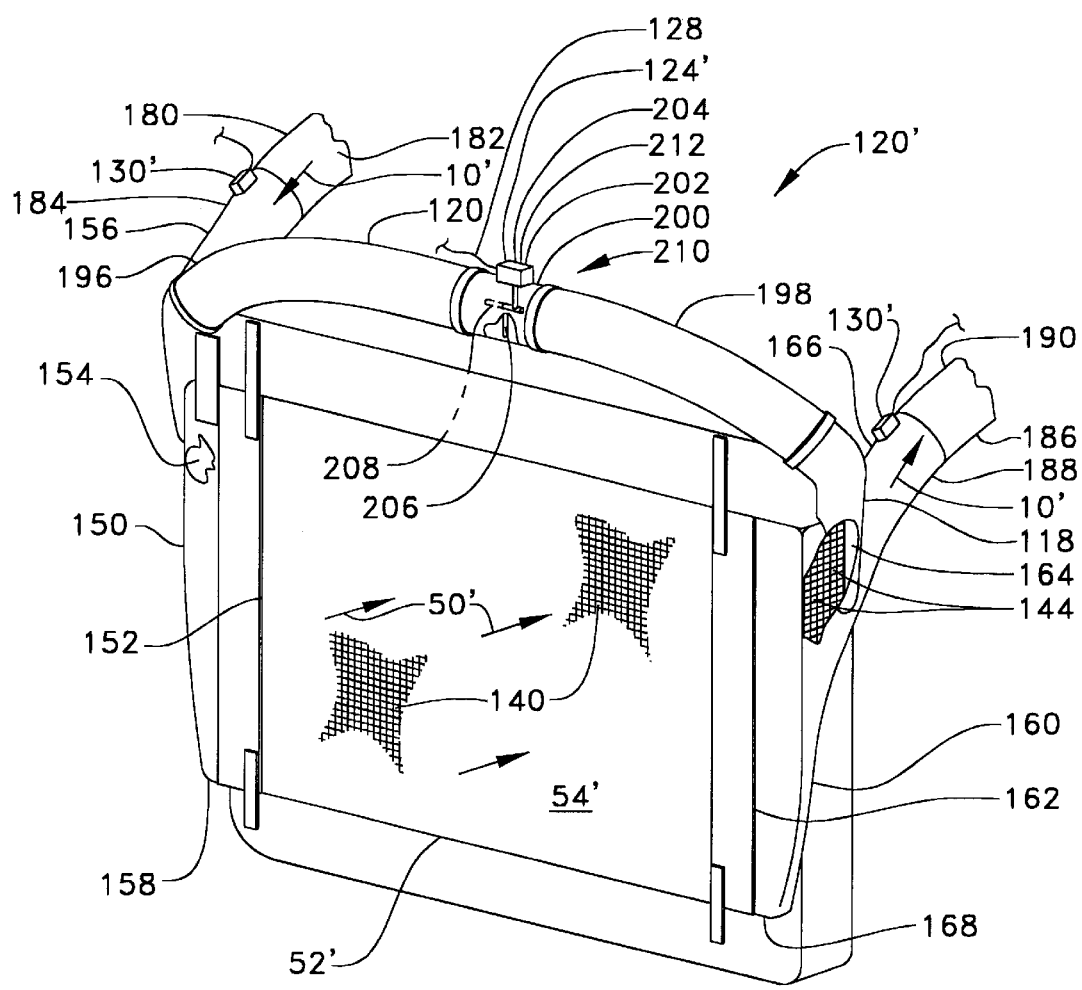

SYSTEM FOR CONTROLLING THE TEMPERATURE OF AN INTAKE AIR

TECHNICAL FIELD

This invention relates generally to an engine and more particularly to a system for cooling intake air with the engine having an exhaust gas recirculation system.

BACKGROUND ART

The use of turbocharged engines is a common practice. The turbocharger increases the quantity of air for combustion and increases the heat value or temperature of the intake air. To compensate for the increased temperature of the intake air, an aftercooler is used to reduce the temperature of the compressed intake air. Many of the cooling systems include a water jacket aftercooler. In the water jacket aftercooler a coolant from the engine is circulated through the aftercooler and the intake air is cooled. The use of engine coolant limits the temperature to which the intake air can be cooled. More recently, the cooling medium of the aftercooler has been converted to use ambient air and an air to air aftercooler has replaced the water jacket aftercooler. As the emissions from engines become more strict, exhaust gas recirculation systems are used to reduce the emissions from such engines. Experience has shown that in some applications and under some operating conditions, especially when using high sulfur fuels, as the intake air is cooled water condenses from the air and with the addition of recirculated exhaust gas sulfuric acid is formed. As the intake air is circulated the sulfuric acid reduces the efficiency and longevity of the engine. Since ambient air is used as a donor intake air and the coolant or recipient fluid, the temperature and humidity of the ambient air varies depending on geographic location and season. Thus, the temperature and humidity of the intake air varies accordingly. Under these varying conditions the formation of water, resulting in sulfuric acid effects combustion and varying characteristics of combustion and the operation of the engine in a negative way. Under certain conditions the emissions therefrom can be increased and the structure of the engine can be damaged due to erosion. And, if the intake air is over cooled, excessive power can be developed and structural damage to the engine will occur. Thus, a system for controlling the temperature of the intake air is needed.

The present invention is directed to overcome one or more of the problems as set forth above.

DISCLOSURE OF THE INVENTION

In one aspect of the invention a system for controlling the temperature of an intake air flow used to support combustion in an engine is disclosed. The system has an exhaust gas having a portion thereof circulated to the intake air flow. An air to air aftercooler has the intake air flow being a donor fluid. An ambient air flow acts as a recipient fluid for cooling the intake air flow and passing through the aftercooler. A plurality of sensors are operatively positioned in the ambient air flow and the intake air flow. A controller is operative connected to the plurality of sensors. One of the ambient air flow restriction system has a restriction device and an intake air flow restriction system has a restriction device. And, the controller defines a position of the restriction device between an open position and a closed position.

BRIEF DESCRIPTION OF THE DRAWINGS

FIG. 2 is a side view of a vehicle having an air to air aftercooler embodying the present;

FIG. 3 is an enlarged front pictorial view of the air to air aftercooler embodying the present invention of FIG. 1 with a plurality of louvers in an open position;

FIG. 4 is an enlarged front pictorial view of the air to air aftercooler embodying the present invention of FIG. 1 with the plurality of louvers in a closed position; and FIG. 5 is an enlarged front pictorial view of the air to air aftercooler embodying the present invention of FIG. 2.

BEST MODE FOR CARRYING OUT THE INVENTION

Figure 1:
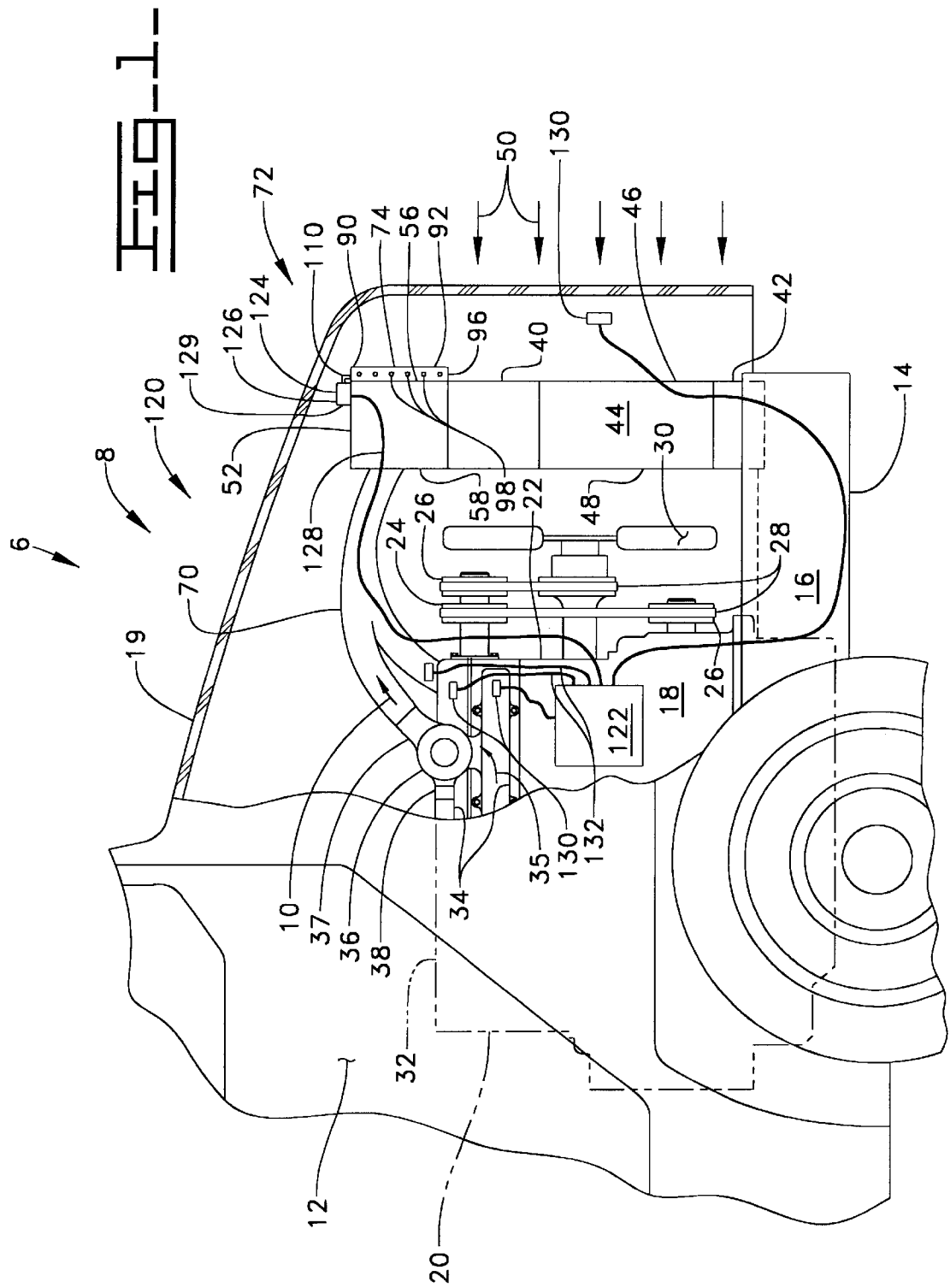
FIG. 1 is a side view of a vehicle having an air to air aftercooler embodying the present.

In FIG. 1 a vehicle 6 is shown having a system 8 for controlling the temperature of an intake air flow 10. In this application, the vehicle 6 is an on highway tractor. However, as an alternative, the vehicle 6 could be any type of work machine, such as an off highway truck, scraper, wheel loader or track type machine. The vehicle 6 has a rear portion 12 and a front portion 14 being opposite one another. A frame 16 extends between the rear portion 12 and the front portion 14. Attached to the frame 16 and position in the vehicle 6 near the front portion 14 is an internal combustion engine 18. In this application, the internal combustion engine 18 is a compression ignition engine being water cooled; however, other types of internal combustion engines 18 can be used without changing the jest of the invention. For example, the engine could be air cooled, or of the two cycle or four cycle configuration, or could be a spark ignition engine. The vehicle 6 has a hood 19 attached to the front portion 14 of the frame 16. The hood 19 has a preestablished configuration. The engine 18 has a rear portion 20 from which power is transferred to a drive train, not shown. And, the engine 18 has a front portion 22 having a drive train 24 of convention construction being a part thereof. The drive train 24 has a plurality of driven pulleys 26 attached thereto. A plurality of belts 28 operationally connect to the respective ones of the plurality of driven pulleys 26 and drive a plurality of accessories 30, such as an alternators, a fan or fans and a pump or pumps. The engine 18 has a plurality of cylinders, not shown, and an intake manifold 32 being in communication with the plurality of cylinders and having the intake air 8 passing therethrough. The engine 18 has an exhaust system 34 having an exhaust gas 35 flowing therein and being in communication with the plurality of cylinders. A turbocharger 36 is connected to the engine 18 and communicates with the intake manifold 32 by way of a compressor section 37 and the exhaust system 34 by way of a turbine section 38 in a conventional manner. A portion of the exhaust gas 35 is recirculated to the intake air for exhaust gas recirculation.

As also shown in FIGS. 2 and 3, a radiator 40 is attached to the frame 16 in a conventional manner near the front portion 14 and is position under the hood 19. The radiator 40 has a frame 42 in which is positioned a core 44 having an air inlet side 46 and an air outlet side 48 positioned opposite one another. One of the plurality of accessories 30, the fan 30 is interposed the radiator 40 and the front portion 22 of the engine 18. In this application, the fan 30 is a sucker type configuration and creates a flow of recipient ambient air, designated by arrows 50. The fan 30 draws recipient ambient air from the inlet side 46 through the core 44 and out the outlet side 48.

An aftercooler 52 is positioned above the radiator 40. As an alternative, the aftercooler 52 can be placed upstream of the flow 50 through the radiator 40 near the air inlet side 46.

As another alternative, the aftercooler 52 can be placed downstream of the flow 50 through the radiator 40 near the air outlet side 48. As a further alternative, the aftercooler 52 can be placed below the radiator 40. And, as a further alternative, the aftercooler 52 could be place remotely from the radiator 40 and have its own fan 30 being driven by an electric or hydraulic motor, not shown. In this application, the aftercooler 52 has a core 54 having an ambient or recipient air inlet side 56 and an air outlet side 58. In the configuration shown in FIG. 2, the aftercooler 52 is a cross flow aftercooler configuration and has a frame 60 in which is positioned the core 54. The core 54 has an inlet end or side 64 through which the intake air or donor intake air flow 10 enters. An outlet end or side 68 of the core 54 is positioned opposite the inlet end 64. The turbocharger 36 and a ducting system 70 of the engine 18 operatively causes the donor intake air 10 to enter the inlet end 64, pass through the core 64, exit the outlet end 68 and travel through another portion of the ducting system 70 to the intake manifold 32. The portion of the exhaust gas 35 to be recirculated is combined with the intake air 10 within the ducting system 70 before the intake manifold 32 but after the intake air 10 passes through the aftercooler 52.

Attached to the ambient or recipient air inlet side 64 of the aftercooler 52 is an ambient air flow restriction system 72. The ambient air flow restriction system 72, in this application, uses a plurality of louvers 74 being movable between a closed position 76, shown in FIG. 2, and an open position 78, shown in FIG. 3. As an alternative, a flapper or guillotine device can be used without changing the essence of the invention. The restriction system 72 has a frame 90 having a pair of horizontal members 92 and a pair of vertical members 94 attached to form a box member 96 having a generally rectangular configuration. Each of the pair of vertical members 94 has a plurality of bores 98 therein. In this application, each of the plurality of bores 98 has a predetermined diameter and spacing therebetween. The restriction system 72 has the plurality of louvers 74 positioned within the box member 96. Each of the plurality of louvers 74 has an end portion 102 positioned within a respective one of the plurality of bores 98 of the vertical members 94. Each of the end portions 102 is configured to rotate within the respective one of the plurality of bores 98 as the respective one of the plurality of louvers 74 moves infinitely variably between the closed position 76 and the closed position 78. The restriction system 72 is positioned under the hood 19.

A linkage 110 is connected to the plurality of louvers 74 and a control system 120 operatively controls the position of the plurality of louvers 74 between the closed position 76 and the open position 78.

The control system 120 has a controller or computer 122 which in this application is a part of the engine 18 configuration. However, as an alternative, the controller 122 can be a separate unit without changing the jest of the invention. An actuator 124, such as a cylinder 126 can be pneumatically or hydraulically actuated and is in operative communication with the controller 122 and the linkage 110. Or, as another example, an electric solenoid can be used. A supply line or wire 128 communicates with the controller 122 and a signal having a varying magnitude is transmitted to a control valve 129 which varies the position of the cylinder 126. A plurality of sensors 130 are attached to the engine 18 in predetermined locations. For example, some of such predetermined locations are within the intake manifold 32 and within the exhaust system 34. Another portion of the plurality of sensors 130 are positioned within the flow of the recipient ambient air 50 before entering the aftercooler 52, upstream of the aftercooler. And, another portion of the plurality of sensors 130 are positioned within the flow of donor intake air 10 before entering the inlet end 64, upstream of the aftercooler 52, and after exiting the outlet end 68, downstream of the aftercooler 52. A portion of the plurality of sensors 130 can monitor ambient temperature, atmospheric pressure and humidity. A plurality of wires or transmitting members 132 are interposed the plurality of sensors 130 and the controller 122 and a signal, or pulse, or pressure or flow is transmitted therethrough between the respective one of the plurality of sensors 130 and the controller 122.

As an alternative, shown in FIGS. 2 and 4 an alternative aftercooler 52' and cooling control system 120' having similar components as the earlier aftercooler 52 and cooling control system 120 is shown. The similar components of the alternative aftercooler 52' is designated by primed ' numbers. The aftercooler 52' is positioned in front of the inlet side 46' of the radiator 40'. The recipient ambient air 50' passes through the aftercooler 52' prior to passing through the radiator 40'. As an alternative, the aftercooler 52' can be placed downstream of the ambient air flow 50' through the radiator 40' near the air outlet side 48'. As a further alternative, the aftercooler 52' can be placed above or below the radiator 40'. As a further alternative, the aftercooler 52' can be placed remote from the radiator 40' and an auxiliary fan, not shown, can be used for circulating the recipient ambient air flow 50' therethrough. In this application, the aftercooler 52' has a core 54' having an ambient or recipient air inlet side 56' and an air outlet side 58'. The core 54' has a plurality of recipient air passages 140 therein and a plurality of donor air passages 142 therein. The plurality of donor air passages 142 have a preestablished cross sectional area forming a preestablished backpressure. The donor intake air flow, designated by the arrow 10' exits the turbocharger 36' and is communicated to the plurality of donor air passages 142, the structure of which will be defined herebelow.

The aftercooler 52' is a cross flow aftercooler configuration and has an inlet or first manifold 150 attached to an inlet end or side 152 of the plurality of donor air passages 142 of the core 54'. The inlet manifold 150 has a blending cavity 154 having a generally triangular configuration defining a base portion 156 and an apex portion 158. An outlet or second manifold 160, which is substantially a mirror image of the inlet manifold 150, is attached to an outlet end or side 162 of the plurality of donor air passages 142 of the core 54'. The outlet manifold 160 has a blending cavity 164 having a generally triangular configuration defining a base portion 166 and an apex portion 168. A ducting system 70' has an inlet duct 180 has an inlet end portion 182 operatively attached to the turbocharger 36'. An outlet end portion 184 of the inlet duct 180 is blendingly attached to the inlet manifold 150 near the base portion 156. An outlet duct 186 has an inlet end portion 188 blendingly attached to the outlet manifold 160 near the base portion 166. An outlet end portion 190 of the duct 186 is operatively attached to the intake manifold 32' of the engine 18' and the exhaust gas 35' circulated to the intake air flow 10' is introduced within this duct 186 near the intake manifold 32'. The inlet manifold 160 has a bypass member 196 attached thereto near the base portion 156. The bypass member 196 of the inlet manifold 160 has a preestablished cross sectional area being about 40 to 70 percent of the preestablished cross sectional area of the plurality of donor air passages 142. The outlet manifold 160 has a bypass member 198 attached thereto near the base portion 166. The bypass member 198 of the outlet manifold 160 has a preestablished cross sectional area being about 40 to 70 percent of the preestablished cross sectional area of the plurality of donor air passages 142. A connecting member 200 is interposed the bypass member 196 of the inlet manifold 150 and the bypass member 198 of the outlet manifold 160. The connecting member 200 has a preestablished cross sectional area being about 40 to 70 percent of the preestablished cross sectional area of the plurality of donor air passages 142. Positioned within the connecting member 200 is a donor intake air restriction device 202. In this application, the donor intake air restriction device 202 is a flapper valve 204 being movable between a closed position 206 and an open position 208, shown in phantom. The valve 204 is infinitely variable between the closed position 206 and the open position 208. As an alternative, the donor intake air restriction device 202 can be of another configuration, such as a ball valve or a guillotine configuration. The bypass member 196 of the intake manifold 150, the connecting member 200, the valve 204 and the bypass member 198 of the outlet manifold 160 define a donor intake air flow restriction system 210. In this application, the bypass member 196 of the inlet manifold 150, the bypass member 198 of the outlet manifold 160, the connecting member 200 and the valve 204 are positioned within the preestablished configuration of the hood 19'. The aftercooler 52' is attached to the frame 42' of the radiator 40' in a conventional manner.

A control system 120' operatively controls the position of the valve 204 between the closed position 206 and the open position 208.

The control system 120' has a controller or computer 122' which in this application is a part of the engine 18' configuration. However, as an alternative, the controller 122' can be a separate unit without changing the jest of the invention. An actuator 124' is in operative communication with the controller 122' and the valve 204. The actuator 124', such as a cylinder 126' can be pneumatically or hydraulically actuated is in operative communication with the controller 122'. For example, an electric solenoid 212 has a supply line or wire 128' communicating with the controller 122' and a signal having a varying magnitude is transmitted to the solenoid 126' through the wire 128'. The solenoid 126' operatively moves the valve 204 between the closed position 206 and the open position 208. A plurality of sensors 130' are attached to the engine 18' in predetermined locations. For example, some of such predetermined locations are within the intake manifold 32' and within the exhaust system 34'. Another portion of the plurality of sensors 130' are positioned within the flow of the recipient ambient air 50' upstream of the aftercooler 52' and within the flow of donor intake air 10' before entering the inlet end 152, downstream of the aftercooler, and after exiting the outlet end 162 upstream of the aftercooler 52'. A plurality of wires or transmitting member 132' are interposed the plurality of sensors 130' and the controller 122' and a signal is transmitted therethrough between the respective one of the plurality of sensors 130' and the controller 122'.

INDUSTRIAL APPLICABILITY

In operation, the vehicle 6 is operating in an environment having a hot temperature, for example being consistently 90 degrees Fahrenheit or above. Under these conditions, the donor intake air 10,10' needs to be cooled to or near its maximum in order to provide maximum power output of the engine 18,18'. Thus, the plurality of sensors 130,130' monitor operating conditions of the engine 18,18' and communicate the respective signals to the controller 122,122'. The controller 122,122' stores, computes, and integrates the signals depending on a fixed set of variables. And, under the operating conditions of the environment, hot temperature, the actuator 124,124' maintains the plurality of louvers 74 in the open position 78 or the flapper valve 204 in the closed position 206. Thus, with the plurality of louvers 74 in the open position 78 the maximum flow of ambient recipient air 50 passes through the core 54 of the aftercooler 52 and the donor intake air 10 is cooled to or near its maximum. And, with the flapper valve 204 in the closed position 206 the maximum flow of donor intake air 10 passes through the aftercooler 52' and the donor intake air 10 is cooled to or near its maximum.

In another example, the vehicle 6 is operating in an environment having a cold temperature, for example being consistently 50 degrees Fahrenheit or below. Under these conditions, the donor intake air 10,10' needs to be prevented from being cooled in order to prevent structural damage to the engine 18,18', efficient operation of the engine 18,18' and prevent excess emissions. Thus, the plurality of sensors 130,130' monitor operating conditions of the engine 18,18' and communicate the respective signals to the controller 122,122'. The controller 122,122' stores, computes, and integrates the signals depending on a fixed set of variable. And, under the operating conditions of the environment, cold temperature, maintains the plurality of louvers 74 in the closed position 76 or the flapper valve 204 in the open position 208. Thus, with the plurality of louvers 74 in the closed position 76 the minimum flow of ambient recipient air 50 passes through the core 54 of the aftercooler 52 and the donor intake air 10 is prevented from being cooled. And, with the flapper valve 204 in the open position 208 the minimum flow of ambient recipient air 50' passes through the core 54' of the aftercooler 52' and the donor intake air 10' is allowed to take the path of least resistance and is equivalently prevented from passing through the aftercooler 52'.

If the vehicle 6 is operating in an environment which is not the hot nor is it the cold temperature, for example being consistently between 50 and 70 degrees Fahrenheit, the restriction system 72,210 must be operated with the plurality of louvers 74 between the closed position 76 and the open position 78 or the flapper valve 204 between the closed position 206 and the open position 208. Under these conditions, the donor intake air 10,10' needs to be cooled but not to its maximum or to its minimum in order to provide maximum power output of the engine 18,18', control emissions from the engine 18,18' and efficiently operate the engine. Thus, the plurality of sensors 130,130' monitor operating conditions of the engine 18,18' and communicate the respective signals to the controller 122,122'. The controller 122,122' stores, computes, and integrates the signals depending on a fixed set of variable. And, under the operating conditions of the environment, neither hot or cold temperature, maintains the plurality of louvers 74 in a position intermediate the closed position 76 and the open position 78 or the flapper valve 204 in a position intermediate the closed position 206 and the open position 208. As the temperature of the environment changes, the position of the plurality of louvers 74 will also vary between the closed position 76 and the open position 78 or the position of the flapper valve 204 will also vary between the closed position 206 and the open position 208 accordingly. Thus, the appropriate flow of ambient recipient air 50,50' passes through the core 54,54' of the aftercooler 52,52' and the donor intake air 10,10' is cooled to its proper temperature to effectively operate the engine 18,18' under all ambient environmental conditions.

Thus, with the system 8 for controlling the temperature of the intake air 10,10' having the ambient air flow restriction system 72 and the intake air flow restriction system 210, the temperature, pressure and humidity of the donor intake air 10,10' can be monitored and controlled to a predetermined temperature. As the ambient temperature of the recipient ambient air 50,50' varies between hot and cold, the pressure varies between high and low and the humidity level varies, the ambient air flow restriction system 72, specifically the plurality of louvers 74 controls the flow rate of recipient ambient air 50 or the flapper valve 204 controls the amount of donor intake air 10,10' passing through the aftercooler 52'. Thus, if the donor intake air 10,10' needs to be cooler, the rate of flow of the recipient ambient air 50 is increased or the quantity of donor intake air 10' passing through the aftercooler 52' is increased. And, similarly, if the donor intake air 10,10' needs to be warmer, the rate of flow of the recipient ambient air 50 is reduced or the quantity of donor intake air 10' passing through the aftercooler 52,52' is decreased. Thus, as the environmental conditions dictate, the conditions are monitored and compensated therefor to prevent the formation of water within the intake air and the further formation of sulfuric acid.

Other aspects, objects and advantages of this invention can be obtained from a study of the drawings, the disclosure and the appended claims.

What is claimed is:

1. A system for controlling the temperature of an intake air flow used to support combustion in an engine, said system comprising:
    an exhaust gas having a portion thereof circulated to said intake air flow;
    an air to air aftercooler having said intake air flow being a donor fluid;
    an ambient air flow acting as a recipient fluid for cooling said intake air flow and passing through said aftercooler;
    a plurality of sensors being operatively-positioned in said ambient air flow and said intake air flow;
    a controller being operatively connected to said plurality of sensors;
    one of an ambient air flow restriction system having a restriction device and an intake air flow restriction system having a restriction device; and
    said controller defining a position of said restriction device between an open position and a closed position.

2. The system for controlling the temperature of said intake air flow of claim 1 wherein said restriction device of said ambient air flow restriction system modulates the flow of ambient air flow through said aftercooler.

3. The system for controlling the temperature of said intake air flow of claim 1 wherein said restriction device of said intake air flow restriction system modulates the flow of intake air flow through said aftercooler.

4. The system for controlling the temperature of said intake air flow of claim 1 wherein said restriction devices being infinitely variable between said open position and said closed position.

5. The system for controlling the temperature of said intake air flow of claim 1 wherein said temperature of said intake air flow being increased with said restriction device of said ambient air flow restriction system being at and near said closed position and with said restriction device of said intake air flow restriction system being at and near said open position.

6. The system for controlling the temperature of said intake air flow of claim 1 wherein said temperature of said intake air flow being decreased with said restriction device of said ambient air flow restriction system being at and near said open position and with said restriction device of said intake air flow restriction system being at and near said closed position.

7. The system for controlling the temperature of said intake air flow of claim 1 wherein said restriction device of said ambient air flow restriction system including a plurality of louvers being onterposed of said aftercooler and said flow of ambient air.

8. The system for controlling the temperature of said intake air flow of claim 1 wherein said restriction device of said intake air flow including a valve interposed an inlet manifold and an autlet manifold of said aftercooler.

9. The system for controlling the temperature of said intake air flow of claim 1 wherein said aftercooler includes a core having a plurality of recipient air passages and a plurality of donor intake air flow passages, said plurality of donor intake air flow passages having a preestablished cross sectional area creating a backpressure, and said air intake flow restriction system including an intake manifold being attached to an air inlet side of said aftercooler and an outlet manifold being attached to an air outlet side of said aftercooler, a connecting member being interposed said intake manifold and said outlet manifold, and said restriction device being positioned in said connecting member.

10. The system for controlling the temperature of said intake air flow of claim 9 wherein said connecting member includes a preestablished cross sectional area being between about 40 to 70 percent of said preestablished cross sectional area of said plurality of donor intake air passages.

11. The system for controlling the temperature of said intake air flow of claim 9 wherein said inlet manifold includes a blending cavity.

12. The system for controlling the temperature of said intake air flow of claim 9 wherein said outlet manifold includes a blending cavity.

13. The system for controlling the temperature of said intake air flow of claim 1 wherein said plurality of sensors positioned in said ambient air flow has one of said plurality of sensors positioned upstream of said ambient air flow into said aftercooler.

14. The system for controlling the temperature of said intake air flow of claim 13 wherein said one of said plurality of sensors being positioned upstream of said aftercooler sensing temperature.

15. The system for controlling the temperature of said intake air flow of claim 13 wherein said one of said plurality of sensors being positioned upstream of said aftercooler sensing pressure.

16. The system for controlling the temperature of said intake air flow of claim 13 wherein said one of said plurality of sensors being positioned upstream of said aftercooler sensing humidity.

17. The system for controlling the temperature of said intake air flow of claim 1 wherein said plurality of sensors being operatively positioned in said intake air flow having one of said plurality of sensors positioned upstream of said intake air flow into said aftercooler and sensing a temperature of said intake air flow.

18. The system for controlling the temperature of said intake air flow of claim 1 wherein said plurality of sensors being positioned downstream of said intake air flow from said aftercooler and sensing a temperature of said intake air flow.

19. The system for controlling the temperature of said intake air flow of claim 1 wherein said controller interpreting a plurality of signals from said plurality of sensors sending a signal to be adapted to operatively move said restriction device between said open position and said closed position.

20. The system for controlling the temperature of said intake air flow of claim 1 wherein said exhaust gas having a portion thereof circulated to said intake air flow being introduced into said intake air flow downstream of said aftercooler.

* * * * *

UNITED STATES PATENT AND TRADEMARK OFFICE
CERTIFICATE OF CORRECTION

PATENT NO. : 6,408,831 B1
DATED : June 25, 2002
INVENTOR(S) : Mark W. Craig et al.

It is certified that error appears in the above-identified patent and that said Letters Patent is hereby corrected as shown below:

<u>Column 8,</u>
Line 2, delete "onterposed of" and insert -- interposed said --.
Line 7, delete "autlet" and insert -- outlet --.

Signed and Sealed this

Third Day of September, 2002

Attest:

Attesting Officer

JAMES E. ROGAN
*Director of the United States Patent and Trademark Office*